July 5, 1966   W. B. HERBERT   3,258,927
SYNCHRONIZING DEVICE
Filed March 20, 1964   6 Sheets-Sheet 2

INVENTOR.
WILLIAM B. HERBERT
BY
ATTORNEYS

July 5, 1966 W. B. HERBERT 3,258,927
SYNCHRONIZING DEVICE
Filed March 20, 1964 6 Sheets-Sheet 3

INVENTOR.
WILLIAM B. HERBERT
BY
Isler & Ornstein
ATTORNEYS

INVENTOR.
WILLIAM B. HERBERT
BY
Isler & Ornstein
ATTORNEYS

July 5, 1966     W. B. HERBERT     3,258,927
SYNCHRONIZING DEVICE
Filed March 20, 1964     6 Sheets-Sheet 6

INVENTOR.
WILLIAM B. HERBERT
BY *Isler & Ornstein*
ATTORNEYS

United States Patent Office 3,258,927
Patented July 5, 1966

3,258,927
SYNCHRONIZING DEVICE
William B. Herbert, 111 Yantacaw Brook Road,
Upper Montclair, N.J.
Filed Mar. 20, 1964, Ser. No. 353,451
24 Claims. (Cl. 60—97)

This invention relates, as indicated, to synchronizing devices, but has reference more particularly to a device of this character which is highly effective for synchronizing the speeds of engines, such, for example, as twin engines employed in the propulsion of boats.

It has heretofore been proposed, as in Kennedy Patent 2,256,569, to provide a synchronizing device for synchronizing the speeds of two internal combustion engines, in which device, a combination of worm gears, worms, bevel gears, and an eccentric are employed.

Such prior devices are effective to some extent where no appreciable amount of force is required to operate the carburetor or throttle control of the internal combustion engines, since any flexibility or "give" in the levers and shafts used in such devices invariably lessens the efficiency of control.

Other disadvantages of such prior or existing devices include the presence of excessive frictional resistance between the parts in the operation of the device, and the fact that parts such as the bevel gears and shafts employed rotate constantly irrespective of whether the engines are being operated nonsynchronously or one of the engines is inoperative, thereby resulting in increased wear of essential parts.

The present invention has, as its primary object, the provision of a synchronizing device which is highly efficient in use or operation, and which overcomes the disadvantages of prior synchronizing devices to which reference has been made.

Another object of the invention is to provide a synchronizing device of the character described which is characterized by movements in which strain or overload is at all times avoided.

A further object of the invention is to provide a synchronizing device of the character described, in which linearly movable rotatable worm gears and a linearly movable carriage are employed, thereby utilizing straight line forces which are designed to greatly increase the efficiency of use or operation of the device.

A still further object of the invention is to provide a synchronizing device of the character described embodying mechanism which may be described as dynamic rather than static.

Other objects and advantages of my invention will be apparent during the course of the following description.

In the accompanying drawings forming a part of this specification, and in which like numerals are employed to designate like parts throughout the same.

Referring more particularly to FIGS. 1 to 11 inclusive of the drawings, the synchronizer will be seen to comprise a box-like container or case, generally designated by reference numeral 1, and a cover or cover plate 2.

The container or case 1 comprises a bottom 3, side walls 4 and 5, and end walls 6 and 7, and the cover or cover plate 2 is adapted to be secured to the upper edges of the walls 4, 5, 6 and 7 by means of screws or bolts 8. The container or case 1 is further provided with base flanges or feet 9, whereby the synchronizer may be rigidly secured to a platform or other support (not shown).

The synchronizer further includes a pair of transversely-spaced worm shafts 10 and 11, which are mounted for rotation in ball-bearings 12, which in turn, are mounted in openings 13 in the end walls 6 and 7.

Figure 5:
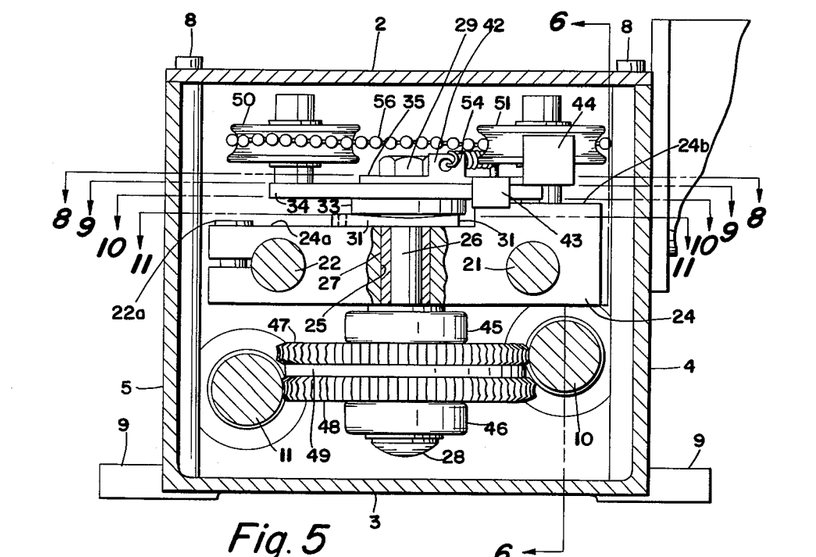
FIG. 5 is a cross-sectional view, taken on the line 5—5 of FIG. 3.

The worm shaft 10 is driven in a counterclockwise direction, as viewed in FIG. 5, by means of a flexible shaft F (FIG. 1) from the "lead" or "master" engine E which flexible shaft is connected to an extension 14 of the shaft 10, the extension 14 being enclosed within a tachometer connection 15 which is bolted to the end wall 7 of the container.

The shaft 10 is extended, as at 16, beyond the end wall 6 of the container, this extended portion of the shaft being enclosed within a tachometer connection 17 which is bolted to the end wall 6.

The worm shaft 11 is driven in a clockwise direction, as viewed in FIG. 5, by means of a flexible shaft F' (FIG. 1) from the "driven" or "slave" engine E' which flexible shaft is connected to an extension (not shown) of the shaft 11 which is similar to the extension 14 and is enclosed within a tachometer connection 18 which is bolted to the end wall 7 of the container.

The shaft 11 is also extended, as at 19, beyond the end wall 6 of the container, this extended portion of the shaft being enclosed within a tachometer connection 20 which is bolted to the end wall 6.

Figure 2:
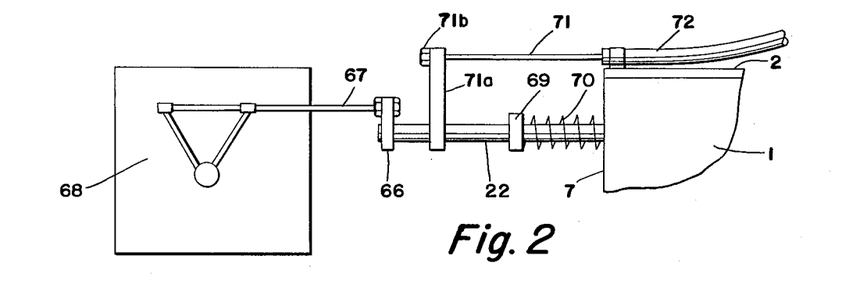
FIG. 2 is a fragmentary view illustrating a modification including means for connecting the throttle control cable to the synchronizing device and the synchronizing device to the throttle, which eliminates the need for double linkage or auxiliary levers.
Figure 3:
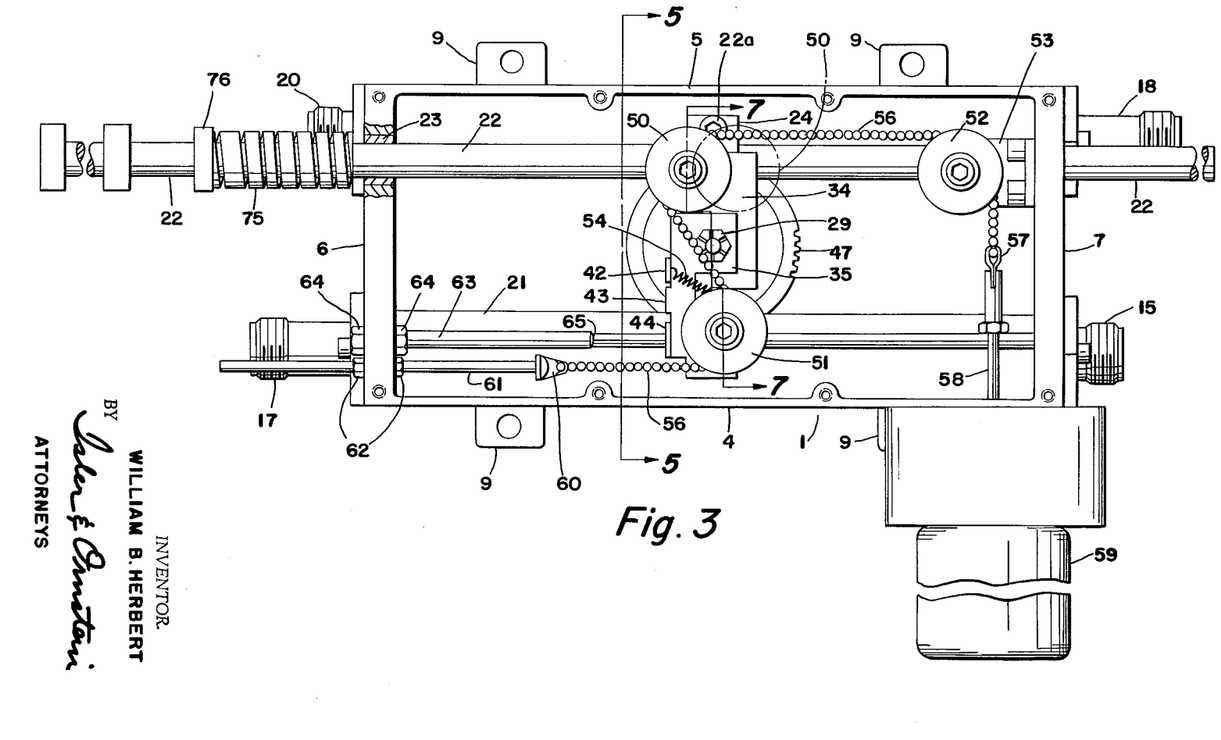
FIG. 3 is a top plan view of the synchronizing device, with the cover removed.
Figure 4:
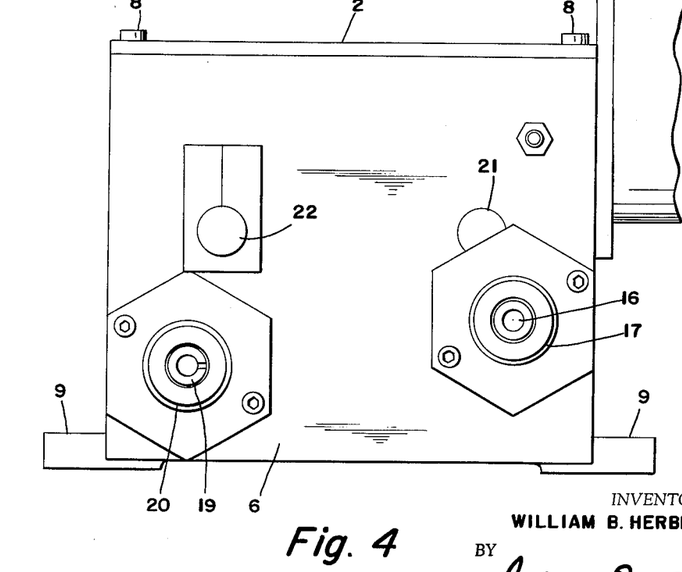
FIG. 4 is an end elevational view of the synchronizing device, as viewed from the left end of FIG. 3.
Figure 6:
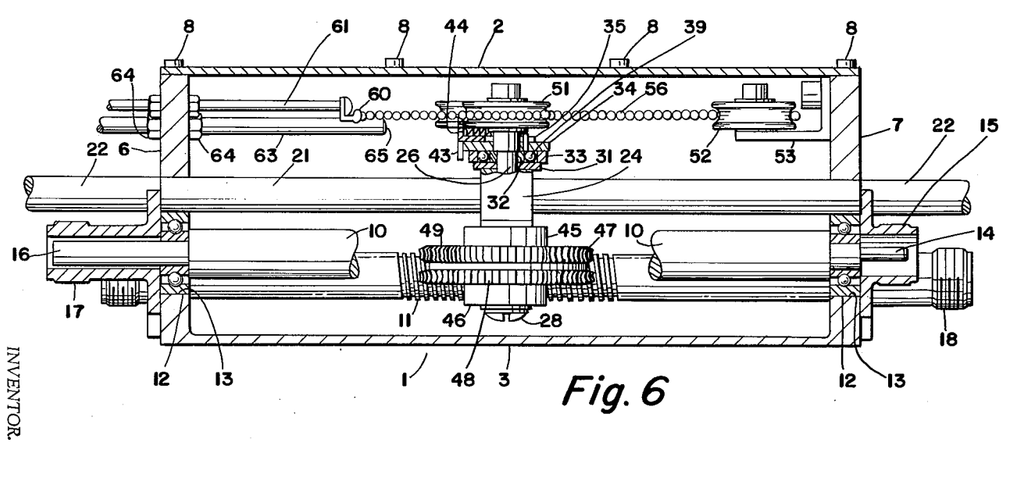
FIG. 6 is a longitudinal cross-sectional view, taken on the line 6—6 of FIG. 5.

The synchronizer further includes spaced guide rods or ways 21 and 22. The guide rod 21 is mounted in the end walls 6 and 7 of the container 1, and is retained against longitudinal movement by the flanges of the tachometer connections 15 and 17. The guide rod 22 is mounted for longitudinal reciprocatory movement in bushings 23 mounted in the end walls 6 and 7, and is of a length such as to extend beyond these end walls, as shown in FIGS. 2, 3 and 6.

Mounted for slidable movement along the guide rod 21 is a carriage 24, which is clamped to the guide rod 22, as by means of a cap-screw 22a.

The carriage 24 is in the form of an elongated member having an upper surface 24a which extends approximately two-thirds of the length of the member, and an upwardly offset surface 24b which extends approximately one-third of the length of the member.

The carriage 24 is provided at its center with an opening 25, through which a bolt 26 extends, a sleeve 27 being interposed between the stem of the bolt and the wall of the opening 25. The head of this bolt is indicated by reference numeral 28.

The bolt 26 has secured to its upper end a nut 29, which is locked to the stem of the bolt.

The nut 29 serves to retain on the surface 24a of the carriage 24, a series of elements consisting of a fixed cam plate 31, a ball retainer consisting of an inner ring 32 and outer ring 33, a movable cam or cam plate 34, and a stop plate 35.

The fixed cam plate 31 is retained against rotation by a dowel pin 36 which is affixed to the plate and extends into an opening 37 in the carriage 24. The plate 31 has inclined upper surfaces 38 (FIGS. 7, 10 and 11) which form a shallow Vee on which balls 39 rest, these balls being retained between the rings 32 and 33 of the ball retainer.

Figures 7, 8, 9, 10, 11:
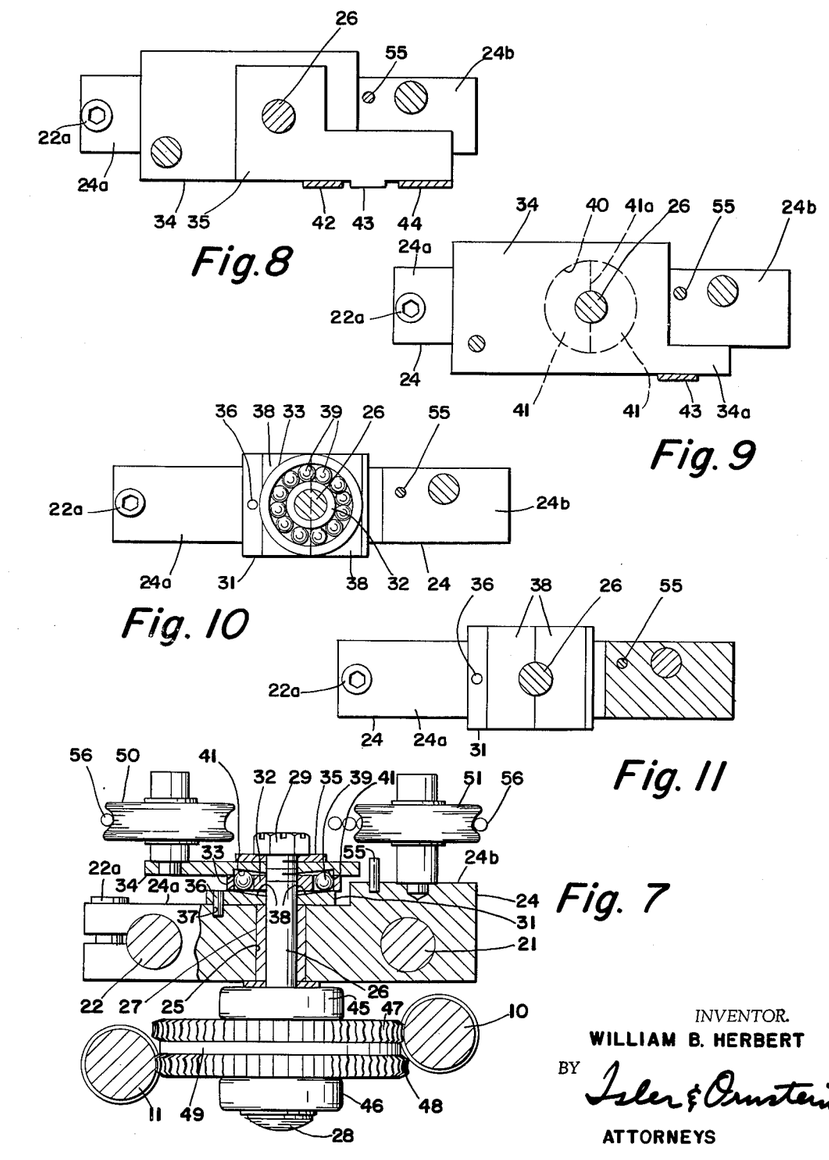
FIG. 7 is a fragmentary cross-sectional view, taken on the line 7—7 of FIG. 3.
FIG. 8 is a fragmentary cross-sectional view, taken on the line 8—8 of FIG. 5.
FIG. 9 is a fragmentary cross-sectional view, taken on the line 9—9 of FIG. 5.
FIG. 10 is a fragmentary cross-sectional view, taken on the line 10—10 of FIG. 5.
FIG. 11 is a fragmentary cross-sectional veiw, taken on the line 11—11 of FIG. 5.

The movable cam plate 34 is disposed over the ball retainer 32–33 and is provided on its lower face with a circular portion, the peripheral edge of which is indicated by reference numeral 40 in FIG. 9, and which consists of flat surfaces 41, which are parallel with the surfaces 38 to form a shallow Vee, the intersection of these surfaces being indicated by the line 41a in FIG. 9. The plate 34, which is of generally rectangular form, is provided at one end with an extension 34a.

The stop plate 35 is of L-shaped configuration and is provided along one of its outer edges with an upwardly-extending flange 42, a downwardly-extending flange 43, and an upwardly-extending flange 44, which is of larger dimensions than the flanges 42 and 43.

The functions of the elements 31, 32, 33, 34 and 35 will be described hereinafter.

Supported by the bolt 26 between the carriage 24 and the head 28 of the bolt, are vertically-spaced thrust bearings 45 and 46, between which are interposed worm gears 47 and 48, a clutch plate 49 being interposed between these worm gears.

The worm gear 47 is in mesh with the worm shaft 10, and the worm gear 48 is in mesh with the worm shaft 11. With the worm shafts 10 and 11 rotating in the directions hereinbefore indicated, the worm gears 47 and 48 will rotate in a counterclockwise direction, as viewed in FIG. 3.

The movable cam plate 34 has mounted thereon at one end a freely revoluble pulley 50, and the carriage 24 has mounted thereon a similar freely revoluble pulley 51, the pulleys 50 and 51 being coplanar, as shown in FIGS. 5 and 7.

A third freely revoluble pulley 52 is mounted on a bracket 53, which is bolted to the end wall 7 of the box 1, this pulley being coplanar with the pulleys 50 and 51.

A tension coil spring 54 (FIGS. 3 and 5) is also provided, one end of which is connected to the flange 42 of the stop plate 35, and the other end of which is connected to a pin 55 (FIG. 7) which extends upwardly from the surface 24b of the carriage 24. The spring 54 normally urges the movable cam plate 34 to the position shown in solid lines in FIG. 3, by reason of the engagement of the flange 43 of the stop plate with the edge of the cam plate 34.

A ball chain 56 is provided which is in engagement with the pulleys 50, 51 and 52, as shown in FIG. 3. One end 57 of this chain is connected to the armature extension 58 of a solenoid 59 which is mounted on the wall 4 of the box 1. The other end 60 of this chain is connected to a rod 61 which is secured to the wall 6 of the box 1 by means of nuts 62.

An adjustable stop 63 is also provided, which is mounted in the end wall 6 by means of nuts 64. The end 65 of this stop is in alignment with the flange 44 of the stop plate 35, and serves as an abutment for the flange 44, for a purpose to be presently described.

Figure 1:
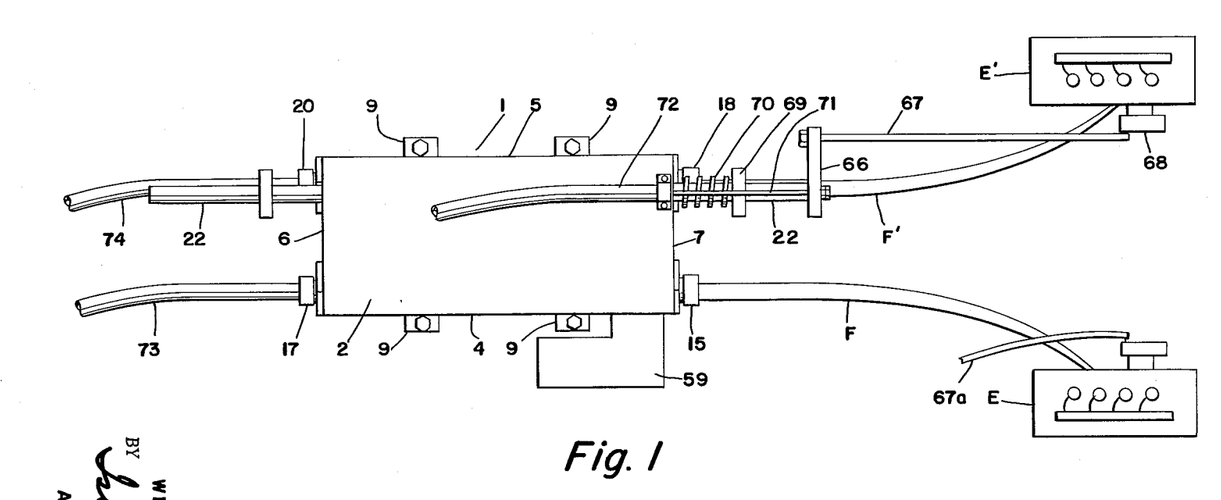
FIG. 1 is a top plan view, illustrating in a somewhat diagrammatic manner, the synchronizing device and its use or operation in conjunction with "master" and "slave" engines.

Referring to FIG. 1 of the drawings, it will be seen that the guide rod 22 has mounted on one end a clamp 66, to which a control rod 67 is secured, this control rod being connected to the throttle 68 of the engine E' for the purpose of controlling the speed of this engine, through use of the synchronizer.

The guide rod 22 has also mounted thereon a collar 69, between which and the end wall 7 a compression coil spring 70 is interposed, for a purpose to be presently described.

For use when the synchronizing device is not in operation, and it is desired to control the speed of the engine E' manually, means have been provided comprising a push-pull cable 71, the housing 72 of which is mounted on the cover 2 of the box. This cable extends to the bridge of the boat on which the engines E and E' are in operation, so that the throttle may be manually controlled through the use of the cable 71. The cable 71 is connected to the clamp 66, so that the control rod 67 may be actuated by pushing or pulling the cable 71.

Tachometer shafts 73 and 74 (FIG. 1) connected to the tachometer connections 17 and 20 respectively may be used as optional equipment, these shafts extending to the bridge of the boat.

The use or operation of the synchronizer may now be described, as follows:

If the worm shafts 10 and 11 are rotating at the same speed, this means that the engines E and E' are operating in synchronism, that is, at the same speed, and there will be no linear movement of the carriage 24 and the rod 22 which is clamped to the carriage. This results from the fact that when the worm shafts 10 and 11 are rotating at the same speed, the worm wheels 47 and 48 merely rotate freely about the bolt 26, and even if movement is transmitted from one of the worm wheels to the other through the clutch plate 49, no movement of the carriage 24 or shaft 22 will ensue, since there is no differential in speed between the worm wheels.

If the clutch plate 49 is disengaged from the worm wheels 47 and 48, and the shafts 10 and 11 are rotating at unequal speeds, the worm wheels will rotate independently at different speeds.

If the shafts 10 and 11 are rotating at different speeds, as determined by tachometer observations or readings, and the solenoid 59 is energized, this exerts tension on chain 56, causing pulley 50 to move in an arc clockwise about the bolt 26, as viewed in FIG. 3, to the position shown in broken lines, the movement of the pulley causing the cam plate 34 to be also moved in such arc. This causes the edge 41a (FIG. 9), formed by the intersection of the surfaces 41 (FIGS. 7 and 9), to exert pressure against the balls 39, which pressure is transmitted to the surfaces 38 and 41, causing the bolt 26 to move upwardly sufficiently to exert pressure through the thrust bearings 45 and 46 to bring about a clutching engagement between the worm wheels 47 and 48 through the clutch plate 49. As a result, the worm wheels 47 and 48 rotate as a unit.

With the worm wheels 47 and 48 thus rotating as a unit, any variation in speed between the worm shafts 10 and 11 will cause longitudinal movement of the carriage 24 and guide rod 22. This movement is transmitted by the guide rod to the throttle 68 of he engine E', through the clamp 66 and rod 67, to thereby bring the speed of the engine E' up to the speed of the engine E. When the speeds are synchronized, movement of the carriage 24 and guide rod 22 stops, since the shafts 10 and 11 are again rotating at the same speeds.

Assuming a given speed of the lead engine E, the clutch assembly and the guide rod 22 will seek a position which will regulate the speed of the slave engine E' which will result in a synchronized or matched speed between the two engines. This control is constant, and any variation in the speed of the lead engine will immediately affect the speed of the slave engine.

In order to provide a control stroke which may be effective over the entire travel of the carriage 24 and rod 22, suitable means have been provided to disengage the clutch at predetermined limits of travel.

Thus, in the movement of the carriage and clutch assembly from left to right, as viewed in FIGS. 3 and 6, and assuming that the pulley 50 is in the "clutch-engaged" position, as indicated in broken lines in FIG. 3, when the pulley 50 reaches the pulley 52, and comes into abutment with the latter, this abutment causes the pulley 50 to return to its original or "clutch-disengaged" position relative to carriage 24, thereby disengaging the clutch, and permitting the worm wheels 47 and 48 to rotate independently of each other.

In the movement of the carriage assembly and clutch from right to left, as viewed in FIGS. 3 and 6, abutment of the flange 44 of the stop plate 35 with the end 65 of the adjustable stop 63 causes the clutch to rock in a counterclockwise direction about the bolt 26, thereby disengaging the clutch.

As the pulley 50 approaches the pulley 52, a coil spring 75 (FIG. 3) mounted on the rod 22 between a collar 76 and the end wall 6, is compressed, and when the clutch is disengaged by the abutment of the pulleys 50 and 52, the expansion of this spring causes the carriage 24 to be retracted upon release of the clutch pressure. This "backing-off" of the carriage causes the clutch to be re-engaged, and avoids a "dead" or inoperative positioning of the carriage.

Similarly, as the flange 44 approaches the stop rod 63, the coil spring 70 (FIG. 1) is compressed, and when the clutch is disengaged by the abutment of the flange 44 with the rod 63, the expansion of this spring causes the carriage 24 to be retracted upon release of the clutch pressure. This "backing-off" of the carriage causes the clutch to be re-engaged, and avoids a "dead" or inoperative positioning of the carriage.

The rod 61 is adjustably axially, and serves to maintain proper tension on the chain 56.

The mechanism, as thus described, is dynamic, rather than static, in the sense that when both worm shafts 10 and 11 are rotating they drive the combined clutch and worm gears 47 and 48 constantly. When the speed of the worm shafts is identical, the worm gears rotate in a fixed position. Faster speed of either worm shaft causes the worm gear to move along the face of the worm shaft in a manner similar to a pinion moving along a rack.

It is thus seen that I have provided a synchronizing device which is highly efficient in use or operation, and which overcomes all of the disadvantages of prior synchronizing devices, that the device is characterized by movements in which strain or overload is at all times avoided, that the device is free from appreciable friction or wear between the parts thereof, and that the device utilizes straight line forces which are designed to greatly increase the efficiency of use or operation of the device.

Although the clutch mechanism has been described as actuated or energized by electrical means, such as a solenoid, it will be readily understood that the clutch may be actuated hydraulically, pneumatically, manually, or in any other manner.

In FIG. 2 of the drawings, there is disclosed a modification in which the push pull cable 71 may be employed to pull back the control rod 67, without interfering with the normal functioning of the synchronizing device.

For this purpose, the cable 71 passes slidably through a small opening in a member 71a which is clamped to the rod 22, the end of the cable 71 being provided with a nut 71b, which abuts the member 71a to retract the control rod 67. Since the cable 71 is slidable through the member 71a, the movement of the rod 22 is not impeded during movement of this rod to the left, as viewed in FIG. 2.

A means is thus provided for connecting the throttle control cable to the synchronizing device and the synchronizing device to the throttle, while eliminating the need for double linkage or auxiliary levers.

In a sense, the device, while termed a synchronizing device, may also be termed a linear differential servo device or mechanism, which may serve, among other things, as a valve actuator for process valves, a machine tool positioning actuator, a machine tool duplicator, and as a computer unit converting relative movement or speed to analog or to digital output.

Figure 12:
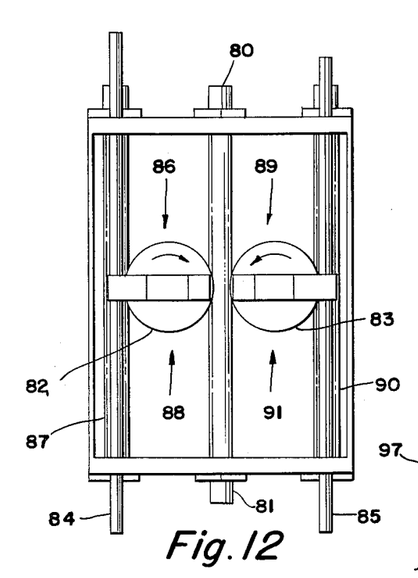
FIGS. 12 and 13 are views illustrating in a diagrammatic manner, the use of the device, in somewhat modified form, as a control to synchronize two engines with the speed of a controlled instrument drive or to a third engine.
Figure 13:
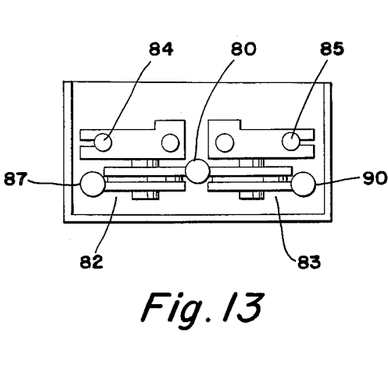

In FIGS. 12 and 13, the use of the device, in somewhat modified form, as a control to synchronize two engines to the speed of a controlled instrument drive or to a third engine, is diagrammatically illustrated.

In this case, reference numeral 80 indicates an input-worm shaft which represents a variable speed controlled power source, the output to the next unit being represented at 81.

The shaft 80 drives clutch mechanisms 82 and 83 similar to the synchronizing device which has been described, and having movable guide rods 84 and 85, which are connected to the throttles of engines.

The arrow 86 designates the direction of correction if the shaft 87 runs slower than the input shaft 80, and the arrow 88 designates the direction of correction if the shaft 87 runs faster than the input shaft 80.

The arrow 89 designates the direction of correction if the shaft 90 runs slower than the input shaft 80, and the arrow 91 designates the direction of correction if the shaft 90 runs faster than the input shaft 80.

Any multiple of such units can be controlled from one input source by connecting a series of shafts 80 in tandem.

A reversal of rotation of the controlled power source will obviously reverse the direction of the correction forces.

Figure 14:
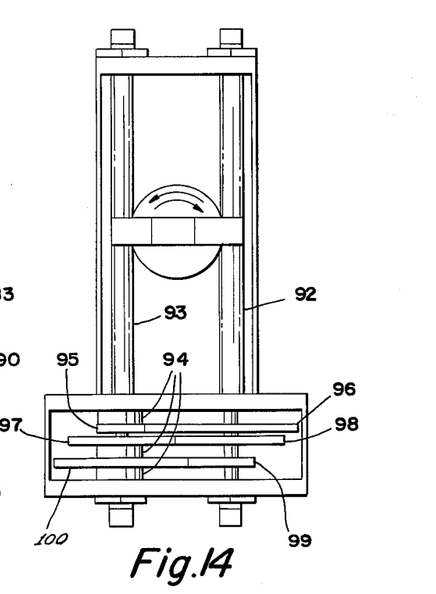
FIG. 14 is a view illustrating in a diagrammatic manner, the use of the device, in somewhat modified form, as a control mechanism to synchronize or equalize power, speed, thrust, force, or output of units which do not produce a rotating output suitable to be fed into the mechanism for reference, but from which proportional data may be expressed in pressure, temperature, force, electrical current or other translatable variable.

In FIG. 14, the use of the device, in somewhat modified form, is illustrated as a control mechanism to synchronize or equalize power, speed, thrust, force or output of units which do not produce a rotating output suitable to be fed into this mechanism for reference, but from which proportional data may be expressed in pressure, temperature, force, electrical current or other translatable variable.

In this case, the shaft 92 can rotate in either direction, and through gearing, clutches or other suitable means shaft 93 is rotated in the opposite direction. The elements 95 and 96 indicate a step-up in drive. The elements 97 and 98 indicate a drive of equal ratio. The elements 99 and 100 indicate a reduction drive.

With reference to the magnetic clutches, it may be noted that when the rotation is in one direction only, an overrunning clutch can be used on the step-up drive.

It is apparent that with the mechanism of FIG. 14, a fixed or adjustable speed drive rotates worm shafts in opposite directions at equal speeds or selected ratios wherein either worm shaft may run faster or slower than the other. It is also apparent that the data output from the device being controlled may be expressed in pressure, temperature, force or any variable capable of causing variation in the speed of rotation of the worm shafts.

Such a mechanism is adaptable for use in connection with jet engines or controlled units, where the data output is other than rotating.

Figure 15:
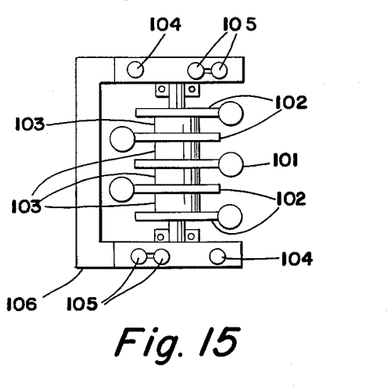
FIG. 15 is a view illustrating in a diagrammatic manner, the use of the device, in somewhat modified form, in connection with a situation wherein the control function requires variable rates.

In FIG. 15, the use of the device, in somewhat modified form, is illustrated in connection with a situation wherein the control function requires variable rates.

In this case, two or more worm shafts and worm gears are employed for the control of devices without rotating anything other than the input worm shaft and selected worm gears. Reference numeral 101 designates an input worm shaft, which has a variable or fixed speed, and a forward or reverse function, and numeral 102 designates worm gears. Reference numeral 103 designates mechanical or magnetic clutches, 104 fixed guide rods, 105 sliding guide rods, and 106 space for additional sliding guide rods.

The data output from the device being controlled or the device doing the controlling may be expressed in pressure, temperature, electronic, hydraulic or any force or variable capable of using the linear travel of movable guide rods.

It is to be understood that the forms of my invention, herewith shown and described, are to be taken as preferred examples of the same, and that various changes may be made in the shape, size and arrangement of parts thereof, without departing from the spirit of the invention or the scope of the subjoined claims.

It will also be understood that the device may be used for synchronizing the speed of prime movers other than internal combustion engines, including, for example, turbines, motors, etc.

Having thus described my invention, I claim:

1. In a servo mechanism of the character described, the combination of a worm shaft, a second worm shaft in spaced parallel relation with said first shaft, a worm gear in mesh with said first shaft, a second worm gear in spaced parallel relation with the first worm gear and in mesh with said second worm shaft, and means for selectively engaging said worm gears to rotate as a unit.

2. A servo mechanism, as defined in claim 1, in which said worm gears are rotatable about an axis which extends in a direction substantially perpendicular to the axes of said worm shafts.

3. A servo mechanism, as defined in claim 2, including a pair of spaced parallel guide rods, a carriage movable along one of said rods and fixed to the other of said rods, a spindle extending through said worm gears and through said carriage, and means mounted on said carriage for energizing said clutch means.

4. A servo mechanism, as defined in claim 3, in which means are provided for activating said clutch energizing means, said activating means including a series of freely rotating wheels and a chain engaging said wheels.

5. A servo mechanism comprising a container having end walls, spaced worm shafts mounted for rotation in said end walls, a worm gear in mesh with one of said shafts and disposed in a plane perpendicular to the axis thereof, a second worm gear disposed in spaced parallel relation to the first worm gear and in mesh with the other of said shafts, and means for clutching said worm gears to rotate as a unit.

6. A servo mechanism, as defined in claim 5, including a fixed rod, a carriage slidable along said fixed rod, and a spindle, about which said worm gears rotate, extending through said carriage.

7. A servo mechanism, as defined in claim 5, including an element longitudinally movable with respect to said container end walls, a carriage connected to said element, and a spindle about which said worm gears rotate, said spindle extending through said carriage.

8. A servo mechanism, as defined in claim 5, including a pair of parallel spaced rods, one of which is fixed in said end walls against longitudinal movement, and the other of which is movable through said end walls, a carriage movable along said fixed rod and clamped to the movable rod, and a spindle about which said worm gears rotate, said spindle extending through said carriage.

9. A servo mechanism, as defined in claim 8, including means movable about said spindle for clutching said worm gears to each other.

10. A servo mechanism, as defined in claim 9, in which said clutching means includes parallel inclined surfaces and balls interposed between said surfaces.

11. A servo mechanism, as defined in claim 1, in which said selectively engaging means comprises a clutch means.

12. A mechanism comprising first and second parallel worm shafts adapted to be rotated in opposite directions, first and second worm gears positioned between said shafts and respectively meshing therewith, means for selectively connecting said gears to rotate as a unit, a longitudinally movable guide rod mounted in spaced parallel relation to said worm shafts, means operatively connecting said gears and rod, said gears when connected as a unit being movable longitudinally along said worm shafts in response to a difference in speed between said shafts.

13. A mechanism, as defined in claim 12, including means for clutching said worm gears to rotate as a unit, a spindle about which said worm gears rotate, and a carriage through which said spindle extends, said carriage being fixed to said rod for longitudinally moving said rod.

14. The mechanism, as defined in claim 13, including means mounted on said carriage for actuating said spindle to clutch said worm gears to each other.

15. The mechanism, as defined in claim 14, in which said spindle-actuating means includes a fixed cam plate mounted on said carriage about said spindle, a second cam plate movable about said spindle, and a series of balls interposed between said cam plates.

16. The mechanism, as defined in claim 14, in which said spindle-actuating means includes means rolling about said spindle.

17. The mechanism, as defined in claim 15, including means for normally maintaining said movable cam plate in inoperative position, and means for moving said cam plate into operative position.

18. The mechanism, as defined in claim 17, including means for declutching said worm gears at predetermined points in the movement of said rod.

19. The mechanism, as defined in claim 18, including spring means for returning said rod to a position in which said worm gears are clutched together.

20. In a synchronizing device of the character described, a container having end walls, a worm shaft mounted for rotation in said end walls, a second worm shaft parallel with the first shaft and mounted for rotation in said end walls in a direction counter to that of said first shaft, a worm gear driven by said first worm shaft, a second worm gear in mesh with said second shaft, selectively operable means for connecting said gears to rotate as a unit, a rod slidably mounted in said end walls in spaced parallel relation with said shafts, and means carried by said rod and supporting said gears, said rod being adapted to be moved by said second shaft longitudinally through said end walls in response to differential in speed between said shafts.

21. A synchronizing device, as defined in claim 20, including a spindle about which said worm gears rotate, and a carriage through which said spindle extends, said carriage being fixed to said rod for longitudinally moving the rod.

22. A synchronizing device, as defined in claim 21, including means mounted on said carriage for actuating said spindle to cause said worm gears to rotate as a unit.

23. A synchronizing device, as defined in claim 22, in which said spindle-actuating means includes a fixed cam plate mounted on said carriage about said spindle, a second cam plate movable about said spindle, and a series of balls interposed between said cam plates.

24. A synchronizing device, as defined in claim 23, including spring-actuated means for maintaining said movable cam plate in a position in which said worm gears are declutched, and means for moving said movable cam plate against the action of said spring means to a position in which said worm gears are clutched together.

References Cited by the Examiner

UNITED STATES PATENTS

| | | | |
|---|---|---|---|
| 1,465,091 | 8/1923 | Prince | 60—97 X |
| 2,105,089 | 1/1938 | Martin | 60—975 |
| 2,292,690 | 8/1942 | Hoge | 74—425 |
| 2,599,885 | 6/1952 | Benua | 74—479 |
| 2,730,908 | 1/1956 | Chillson | 74—425 |
| 2,896,476 | 7/1959 | Williams | 74—724 |

SAMUEL LEVINE, *Primary Examiner.*

ROBERT R. BUNEVICH, *Examiner.*